United States Patent [19]
Takagi et al.

[11] Patent Number: 4,713,876
[45] Date of Patent: Dec. 22, 1987

[54] MACHINE TOOL WITH GANG HEAD INTERCHANGE DEVICE

[75] Inventors: Masayoshi Takagi, Kariya; Yukio Hoshino, Gamagouri; Hiroki Yamauchi, Kariya, all of Japan

[73] Assignee: Toyoda Koki Kabushiki Kaisha, Kariy, Japan

[21] Appl. No.: 26,375

[22] Filed: Mar. 16, 1987

[30] Foreign Application Priority Data

Mar. 25, 1986 [JP] Japan .................................. 61-66604

[51] Int. Cl.$^4$ ............................................. B23Q 3/157
[52] U.S. Cl. ....................................................... 29/568
[58] Field of Search ................................ 29/568, 26 A

[56] References Cited

U.S. PATENT DOCUMENTS

| | | | |
|---|---|---|---|
| 3,354,761 | 11/1967 | Sadier | 29/568 |
| 3,509,619 | 5/1970 | Lipp | 29/568 |
| 3,851,380 | 12/1974 | Kurimoto et al. | 29/568 |
| 4,110,898 | 9/1978 | Yamaoka | 29/568 |
| 4,117,586 | 10/1978 | Uchida et al. | 29/568 |
| 4,125,932 | 11/1978 | Kielma et al. | 29/568 |
| 4,356,620 | 11/1982 | Babel et al. | 29/568 |
| 4,429,443 | 2/1984 | Köiblin | 29/26 A |
| 4,590,662 | 5/1986 | Norota | 29/568 |
| 4,646,423 | 3/1987 | Schlesinger | 29/568 |
| 4,649,610 | 3/1987 | Onishi et al. | 29/26 A |

FOREIGN PATENT DOCUMENTS

| | | | |
|---|---|---|---|
| 55-11722 | 1/1980 | Japan | 29/568 |
| 61-226207 | 10/1986 | Japan | 29/568 |
| 2108019 | 5/1983 | United Kingdom | 29/568 |

*Primary Examiner*—William R. Briggs
*Attorney, Agent, or Firm*—Oblon, Fisher, Spivak, McClelland & Maier

[57] ABSTRACT

A compact machine tool for automatically interchanging two gang heads mounted at the front end of a machining unit. The machine tool includes a horizontally movable tool support, a revolving body mounted above the tool support and rotatable about a first horizontal axis, a tiltable body capable of angularly moving about a second horizontal axis perpendicular to the first horizontal axis, and a gang head magazine. The revolving body is so rotated as to interchange the two gang heads respectively placed in an upper position and a lower position. The magazine has a rotary body for moving plural gang heads within a horizontal plane so that they may be successively placed in a front position.

13 Claims, 5 Drawing Figures

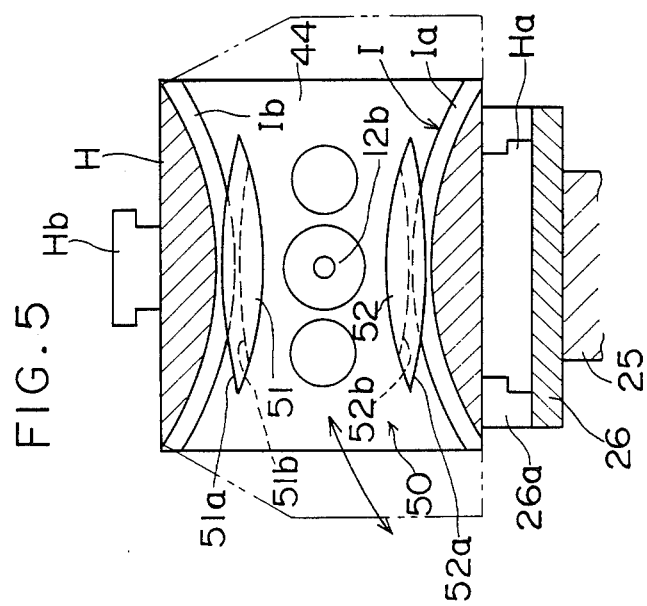
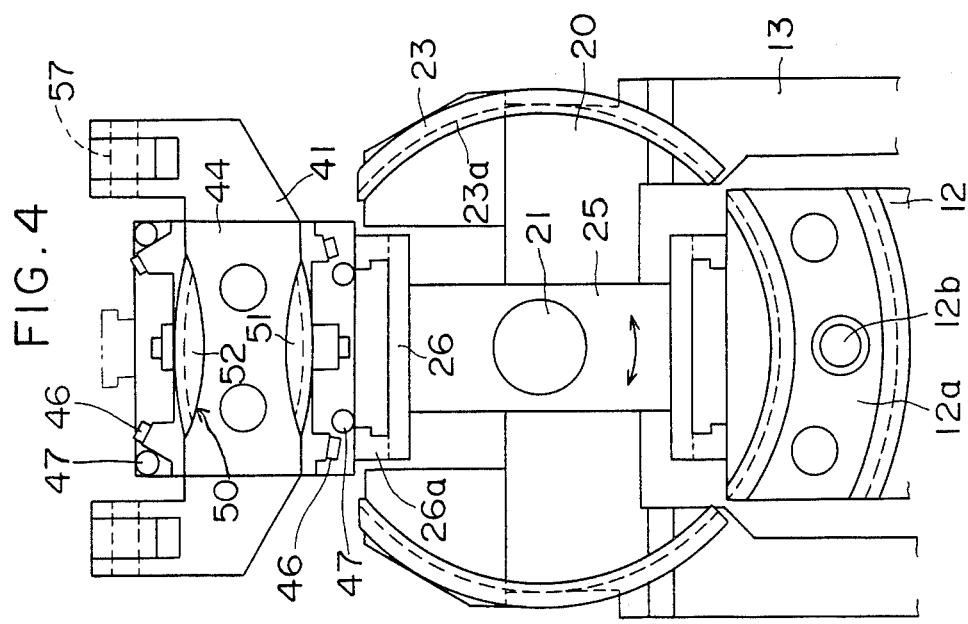

MACHINE TOOL WITH GANG HEAD INTERCHANGE DEVICE

FIELD OF THE INVENTION

The present invention relates to a machine tool equipped with a plurality of gang heads which are mounted at the front end of a machining unit and which are used in turn automatically.

BACKGROUND OF THE INVENTION

Machine tools of this kind are disclosed in Japanese Patent Unexamined Laid-Open No. 11722/1980, U.S. Pat. Nos. 3,851,380 issued to M. Kurimoto et al., and 3,509,619 issued to W. Lipp. The machine tool disclosed in the aforementioned Japanese Patent specification has the problem that the capacity to store gang heads is very limited. In each machine tool disclosed in the aforementioned two U.S. patents, a pair of conveyance paths extends from a gang head storage magazine to the sides of the machining unit to take in and out a workpiece, the magazine being mounted in the rear of the machine tool. An access passage extends between these paths and to the portion of the machining unit to which gang heads are mounted. This has introduced the problem that the front portion of the machine is wide.

A machine tool free of these problems is disclosed in U.S. Pat. No. 4,125,932 issued to E. J. kielma et al. In this machine, an arm for simultaneously interchanging two gang heads is mounted between the position at which each gang head is mounted to the machining unit and a standby position that is disposed rearwardly and upwardly of the machining unit. Since the arm rotates about an axis which is inclined at an angle of 45° to the direction of movement of the machining unit, relatively large space is needed to interchange the gang heads simultaneously, or the sleeve of the arm must be long to avoid physical interference between the gang heads and the machining unit during the exchange operation. This increases the time taken to interchange the heads. During the exchange operation, the two gang heads are held only by the arm and so the stability is poor. Hence, the speed at which the arm is rotated must be maintained low. Further, it is necessary that a gang head storage magazine which is located upwardly and rearwardly of the machining unit be disposed sufficiently remotely from the standby position. This has increased the space of the floor occupied by the whole machining system including the frame that supports the storage magazine.

SUMMARY OF THE INVENTION

Accordingly, it is a main object of the present invention to provide a machine tool equipped with a gang head interchange device which can minimize the space needed to exchange one gang head with another, using a revolving body between the position at which each gang head is mounted to the machining unit and a standby position.

It is another object of the invention to provide a gang head interchange device capable of holding two gang heads with certainty while they are being interchanged simultaneously between the mounting position and the standby position, thus shortening the time taken to interchange the heads simultaneously.

It is a further object of the present invention to provide a machine tool in which a gang head storage magazine can be disposed upwardly and rearwardly of the machining unit and close to the standby position, whereby reducing the space of the floor occupied by the machine including the frame that supports the storage magazine.

In summary, a machine tool equipped with a gang head interchange device according to the present invention has a revolving body which is supported by a frame above a tool support and capable of rotating about an axis extending in a first horizontal direction. This revolving body interchanges the positions of at least two gang heads, one of which is located in a mounting position at which each head is mounted to the tool support, the other being located in a standby position. The machine tool further includes a tiltable body mounted so as to be angularly movable between its horizontal and vertical positions. The tiltable body acts to convery at least one gang head between the standby position and a takeout position lying within a storage magazine. The tiltable body is equipped with a guide means which, when the tiltable body is placed in its horizontal position, serves to guide at least two gang heads that are rotated by the revolving body. When the tiltable body is placed in its vertical position, the guide means cooperates with the magazine to guide plural gang heads that are indexed within the magazine.

In this structure, the revolving body interchanges gang heads within a vertical plane, the gang heads being located in the mounting position and the standby position, respectively. The space required for this interchange can be made small. During the interchange, the heads can angularly move at a small radius of rotation. Consequently, the revolving body can be rotated at a high speed.

In another aspect of the invention, a pair of arc-shaped guide members is fixed to the frame, and both ends of each of these guide members extend to the vicinities of the arc-shaped guide means mounted on the surface of the tool support on which the heads are mounted and also to the vicinities of the guide means of the tiltable body placed horizontally. The guide members guide the movement of the heads rotated by the revolving body. While the gang heads are being interchanged by the revolving body, they are held by the arc-shaped guide members with certainty. This permits the revolving body to be rotated at a high velocity.

Other objects and features of the invention will appear in the course of the description thereof which follows.

BRIEF DESCRIPTION OF THE DRAWINGS

FIG. 4 is an enlarged view of the portion of the machine tool shown in FIG. 1 as viewed in the direction indicated by the arrow IV, and in which the gang heads have been removed; and FIG. 5 is an enlarged cross section taken along line V—V of FIG. 2.

DETAILED DESCRIPTION OF THE PREFERRED EMBODIMENT

Figure 1:
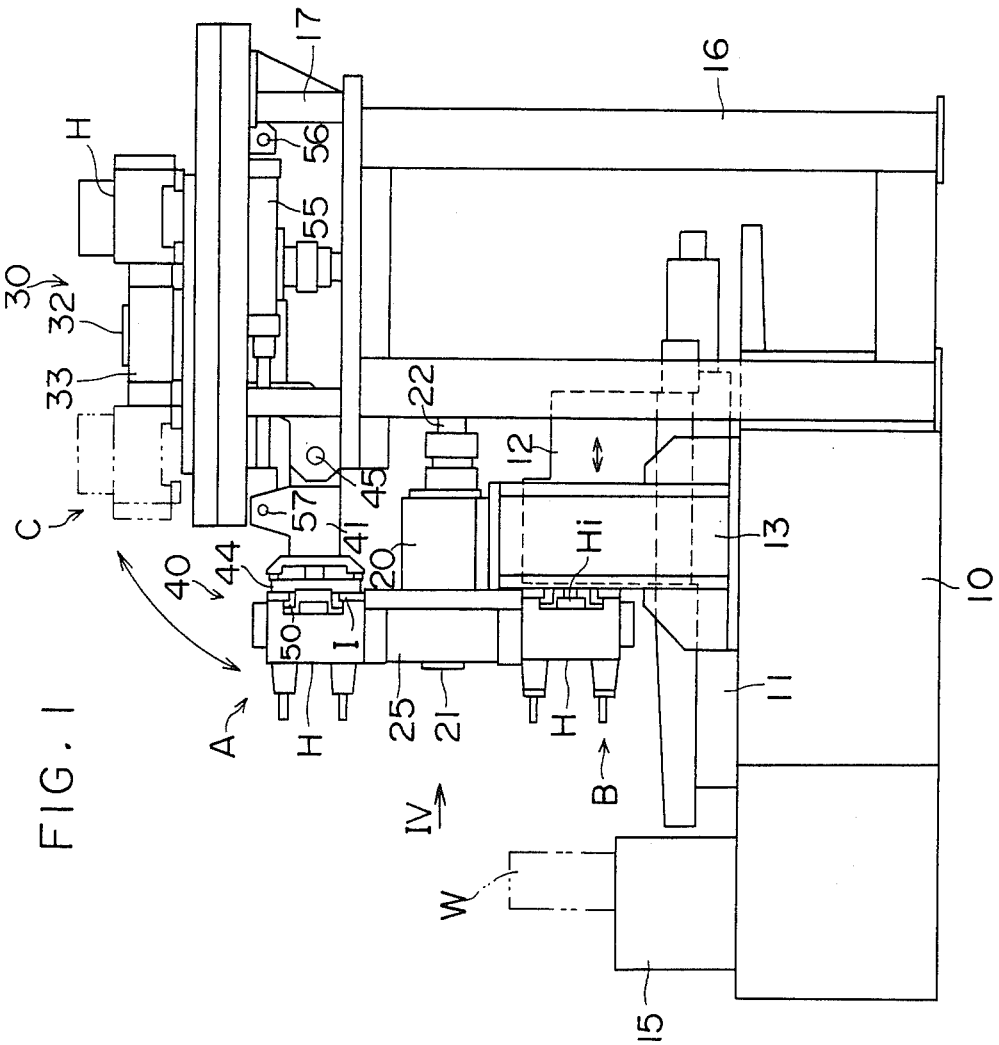
FIG. 1 is a side elevation of a machine tool having a gang head interchange device according to the invention.

Referring to FIGS. 1–4, there is shown a machine tool embodying the concept of the present invention.

This machine tool has a bed 10 on which a feed device 11 is mounted. A machining unit 12 is carried on the feed device 11 and fed back and forth. An index device 20 is held to the bed 10 by a pair of gate-like poles 13 such that it is disposed just above the machining unit 12. A revolving body 25 is held to the body of the index device 20 by a horizontal shaft 21. Two gang heads H are detachably mounted to the outside of the revolving body 25 in a diametrically opposite relation to each other. The revolving body 25 is rotated by a hydraulic motor 22 to perform an indexing operation. Specifically, the revolving body 25 moves each gang head H either into a standby position A or into a mounting position B that is located in front of the machining unit 12.

Figure 2:
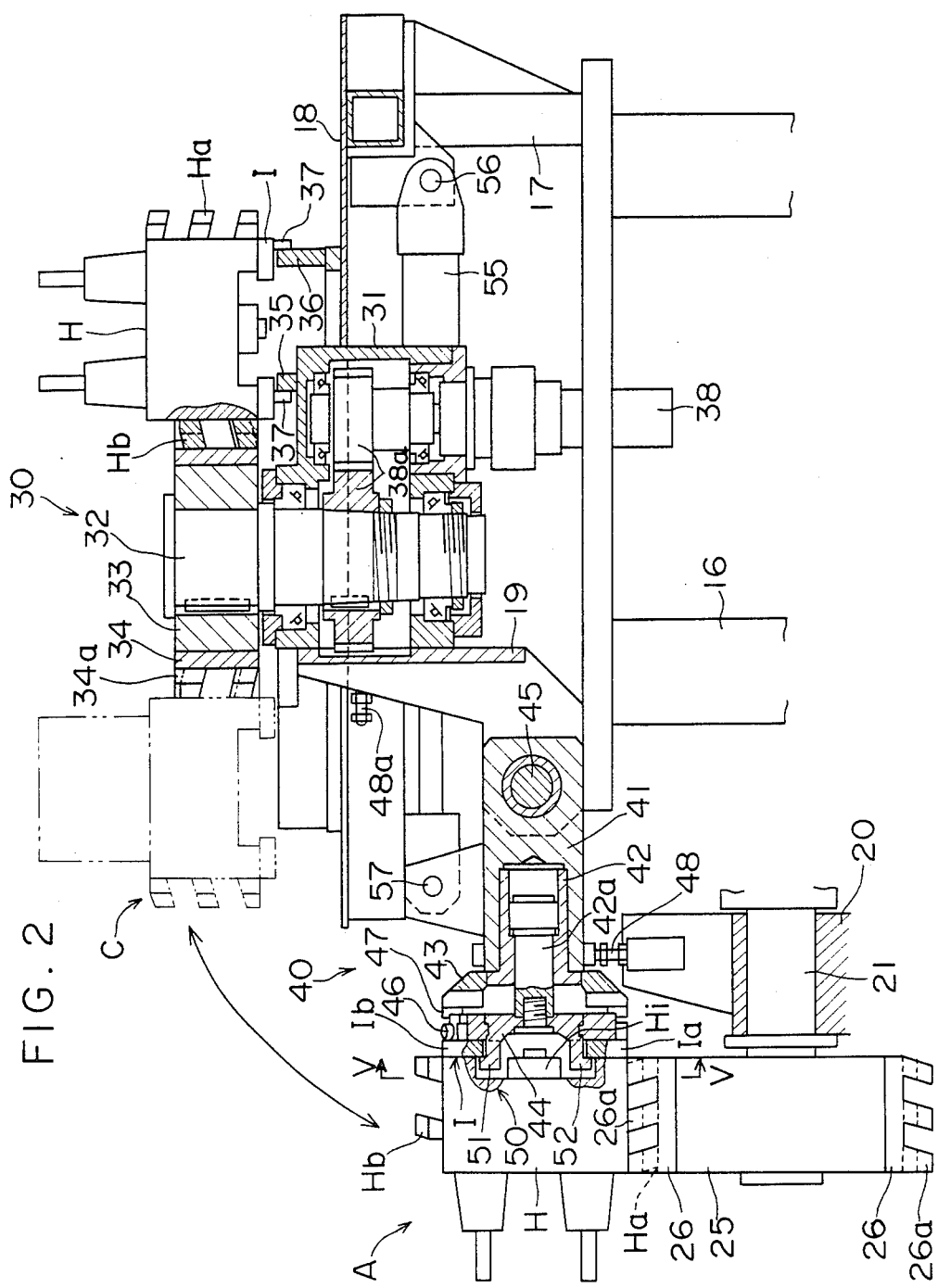
FIG. 2 is a partially cutaway side elevation of main portions of the machine tool shown in FIG. 1.

As shown in FIG. 2, engaging members 26 are fixed to the outer surfaces of the revolving body 25. Three pairs of inclined protrusions 26a are formed on each engaging member 26 and axially spaced from each other. One side surface of each gang head H has three engaging members Ha which are inclined similarly and come into engagement with the protrusions 26a so as to be axially slidable. When the engaging members Ha engage their respective protrusions 26a, the gang head H is mounted to the revolving body 25.

Referring still to FIG. 2, the engaging members Ha of the gang head H placed in the standby position A and the protrusions 26a engaging with these engaging member Ha extend substantially circumferentially around a horizontal shaft 45 to which the tiltable body 41 of a shifting device 40 (described later) is pivotally mounted. Therefore, when the tiltable body 41 is caused to slide axially to disengage the engaging members Ha from the protrusions 26a i.e., when the protrusions 26a and the engaging members Ha are placed on different circles which are coaxial with respect to the horizontal shaft 45, the gang head H can rotate about the shaft 45 and disengage from the revolving body 25.

Engaging members Hb which come into engagement with protrusions 34a formed on a rotary body 33 mounted in a magazine 30 (described later) are mounted on the side surfaces of the gang heads H that are opposite to the side surfaces having the engaging members Ha. In the same manner as the engaging members Ha, the engaging members Hb extend substantially circumferentially around the horizontal shaft 45 when each head H is placed in the standby position A. An engaging member I consisting of engaging plates Ia and Ib is mounted at the rear of the head H. When the revolving body 25 is rotated to move the head H laterally from the standby position A or the mounting position B, the head H engages a groove 23a formed in a guide rail 23, as shown in FIG. 4. Thus, the head H is prevented from moving axially. The rail 23 is fixed to the body of the index device 20. When the head H is placed in the mounting position B where it is located in front of the machining unit 12, it is mounted at the front end of the machining unit 12, because a guide body 12a engaging with the engaging member I has moved rearward. Under this condition, the input shaft Hi of the head H is coupled to the output shaft 12b of the machining unit 12. When the output shaft 12b is rotated, the input shaft Hi transmits the rotary motion to a plurality of tools, for example drills, on the gang head H. The head H mounted on the front surface of the machining unit 12 is advanced together with the unit 12 to machine a workpiece W supported on a base 15.

Figure 3:
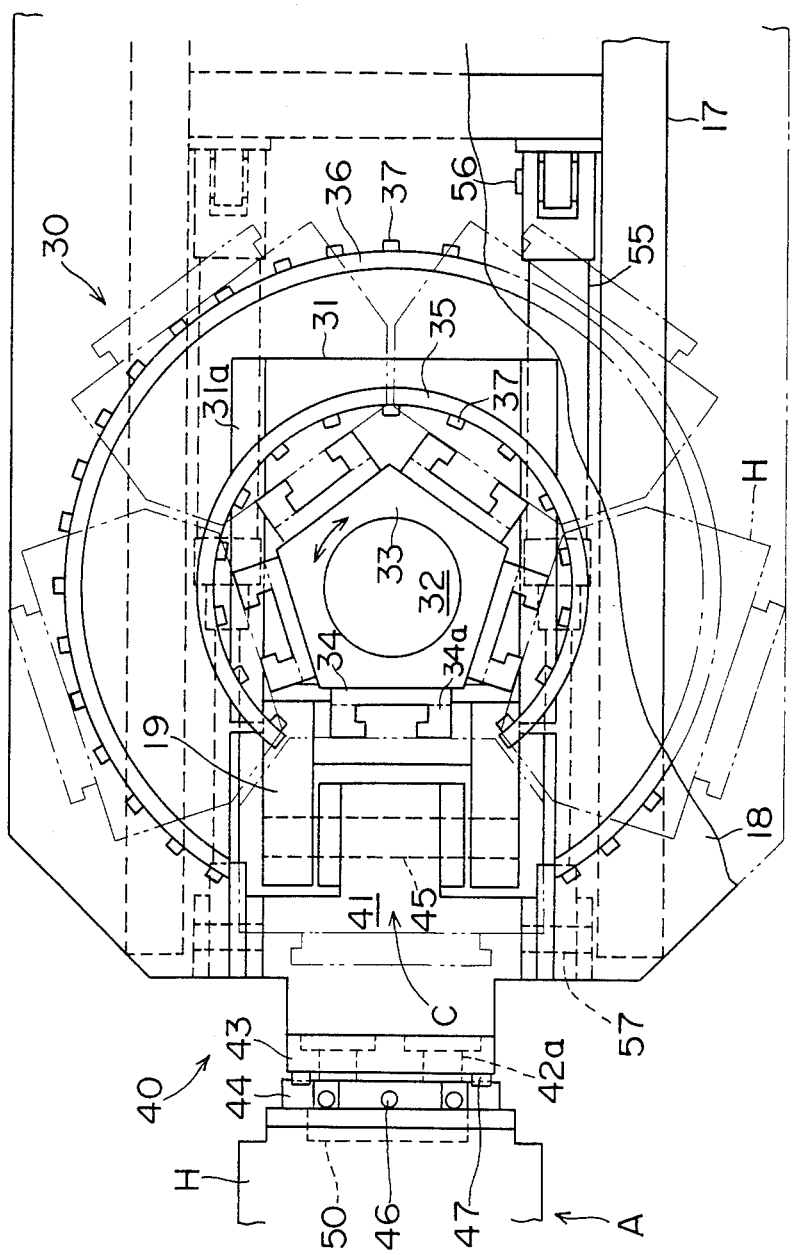
FIG. 3 is a plan view of main portions of the machine tool shown in FIG. 1.

As shown in FIGS. 1-3, the aforementioned magazine 30 is mounted at an upper rear position with respect to the standby position A by means of frames 16, pillars 17, and a shelf plate 18. The frames 16 are disposed independently of the bed 10. The pillars 17 and the plate 18 are mounted on the frames 16. The magazine 30 comprises a driving device 31 and the aforementioned rotary body 33 which is pivotably carried on the device 31 through a vertical shaft 32. The driving device 31 is mounted on the frame 16 and pillars 17 through brackets 19 and flanges 31a. The magazine 30 further includes an inner rail 35 and an outer rail 36 which are disposed coaxially with the vertical shaft 32. The rails 35 and 36 are rigidly secured to the driving device 31 and the plate 18, respectively. As can be seen from FIG. 3, the rotary body 33 takes the form of a regular pentagon. Five gang heads H are detachably attached to the radial outer surfaces of the rotary body 33, which is rotatable within a horizontal plane by a hydraulic motor 38 via a pair of gears 38a and the vertical shaft 32 to perform an indexing operation. Thus, the heads H are successively placed into a takeout position C at the side of the standby position A.

As shown in FIG. 2, the engaging members 34 are fixed to the outer side surfaces of the rotary body 33, and each of these side surfaces has two inclined protrusions 34a which are spaced from each other in the axial direction of the rotary body 33. The engaging members Hb fixed to the outer side surfaces of each gang head H engage the engaging members 34, and are rotated with the rotary body 33 within a horizontal plane. When any one pair of the protrusions 34a is placed in the takeout position C, the protrusions 34a extend substantially circumferentially around the horizontal shaft 45 of the shifting device 40, in the same manner as the protrusions 26a of the revolving body 25. When the engaging members Hb slide vertically and disengage from the protrusions 34a, the heads H can rotate about the horizontal shaft 45 and disengage from the rotary body 33. As can be seen from FIG. 3, the rails 35 and 36 have cutout portions corresponding to the takeout position C. Rollers 37 are mounted on the rails 35 and 36 to guide the heads H rotated by the rotary body 33 at the positions of engaging plates Ia and Ib.

The shifting device 40 is now described in detail. The device 40 is disposed at the rear of the standby position A and below the takeout position C, and is operable to exchange the gang head H held by the revolving body 25 at the standby position A with the head H held by the magazine 30 at the takeout position C. As shown in FIGS. 1-3, the shifting device 40 has a tiltable body 41 supported by the frames 16 so as to be rotatable within a vertical plane about the horizontal shaft 45. A pair of juxtaposed shifting cylinders 42 are mounted at the front end of the tiltably body 41. The cylinders 42 have pistion rods 42a whose front ends support a guide member 44 in such a manner that the member 44 is shiftable radially of the horizontal shaft 45. The tiltably body 41 is angularly movable within a vertical plane about the horizontal shaft 45 by a rotating cylinder 55 whose rear end is pivotally carried by one of the pillars 17 through a connecting pin 56 and whose piston rod is pivotably connected to the tiltable body 41 through another connecting pin 57. In the condition shown in FIG. 2, the tiltable body 41 is placed horizontally and bears against a stopper 48 mounted on the body of the index device 20 so as to place the guide member 44 at the standby position A. When the tiltable body 41 is rotated to its vertical position, it bears against a stopper 48a mounted on the bracket 19 so as to place the guide member 44 at the takeout position C. A seat member 43 having abutment portions 47 is secured to the front end of the tiltable body 41 and located slightly rearwardly of the guide member 44.

As shown in FIGS. 2-4, the guide member 44 has a guide-and-support member 50 which engages and supports the engaging member I of each head H. As shown in FIG. 5, the guide-and-support member 50 compriese a pair of lenticular members 51 and 52 which are spaced vertically from each other and are secured to the guide member 44. The outer surfaces 51a and 52a of the lenticular members 51 and 52 are arc-shaped and provided with similar arc-shaped grooves 51b and 52b, respectively. When the guide member 44 is placed at the standby position A and is shifted forward by the cylinders 42, it engages and guides a gang head H which comes to be indexed by the revolving body 25 to the standby position A.

Referring to FIG. 5, the outer surface 51a of the upper lenticular member 51 and the inner fringes of groove 51b and the engaging plate Ia of each gang head H are coaxial with the horizontal shaft 21 of the revolving body 25. When the head H is rotated for indexing purposes, as indicated by the arrows, the engaging plate Ib of the head H is guided by the outer surface 51a of the upper lenticular member 51 and engages the groove 51b. Thus, the head H is engaged and guided by the guide member 44. As shown in FIG. 4, a plurality of support rollers 46 that bear on the back surfaces of the engaging plates Ia and Ib are mounted on the guide member 44. The inner surfaces of the lenticular members 51 and 52 are arc-shaped to prevent the input shaft Hi from interfering with the lenticular members, the input shaft Hi protruding from the center of the rear surface of the head H.

When the engaging member I engages the guide-and-support member 50, if the piston rods 42a of the cylinders 42 are moved backward, then the heads H move backward together with the guide member 44, disengaging the engaging members Ha from the protrusions 26a. At the same time, the seat member 43 at the front end of the tiltable body 41 pushes the heads H via the abutment portions 47 to inhibit movement of the guide member 44. In this state, when the rotating cylinder 55 is operated, the tiltable body 41 rotates through 90° within a vertical plane to place the guide member 44 in the takeout position C within the magazine 30 together with the heads H. Then, the piston rods 42a of the cylinders 42 are moved forward. This elevates the heads H to bring their engaging members Hb into engagement with the protrusions 34a on the rotary body 33 and to release the heads H from the guide member 44.

Under this condition, the support rollers 46 on the guide member 44 are arranged on the same circle that lies at the same height as the support rollers 37 on the rails 35 and 36. The outer surface 52a and groove 52b and the inner fringe of the engaging plate Ib of each head H are coaxial with the vertical shaft 32 of the rotary body 33. Therefore, when the rotary body 33 is rotated by the hydraulic motor 38 to perform an indexing operation, the gang head H held to the guide member 44 at the takeout position C is shifted onto the rollers 37 on the rails 35 and 36 and received in the magazine 30. This rotation brings a new head H received in the magazine 30 into the takeout position C and then this head H is carried on the guide member 44. Subsequently, the rods 42a of the cylinders 42 are retracted to lower the new head H. This disengages the head H from the rotary body 33. Concurrently, the head is engaged by the guide member 44.

Thereafter, the cylinder 55 is operated to place the guide member 44 in the standby position A together with the new head H. The rods 42a of the cylinders 42 are then advanced to bring the new head H into engagement with the revolving body 25. This permits the head H to be moved into the mounting position B, where it can be installed in the machining unit 12 and used.

In this way, the used head H held by the revolving body 25 is exchanged with another head H retained in the magazine 30. This exchange operation can be carried out while the workpiece W is being machined.

In the above example, the guide member 44 can be moved relative to the tiltable body 41 radially of the horizontal shaft 45 by the cylinders 42 to disengage the gang head H from the revolving body 25 and from the rotary body 33 and to bring the head H into engagement with the guide member 44. Hence, neither another actuator for bringing the head H into engagement with the rotary body 33 nor a further actuator for bringing the head H into engagement with the revolving body 25 are necessary. However, the invention is not limited to this structure. The invention can also be practiced using such separate actuators. Also in the above example, the number of the gang heads H simultaneously held to the revolving body 25 is two. Of course, the invention is not restricted to this number. For instance, four gang heads H may be held to the revolving body 25 simultaneously.

When it is necessary to exchange some gang head H retained within the magazine 30 with another, the head H is raised from the rollers 37 by a loader or the like. Then, the engaging members Hb are disengaged from the protrusions 34a. Subsequently, the head H is withdrawn obliquely upwardly. Another gang head H can be introduced into the magazine 30 in the manner opposite to the foregoing.

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool having a device for interchanging gang heads each of which holds a plurality of tools rotatably, said machine tool comprising:
   a base;
   a tool support mounted on the base so as to be movable in a first horizontal direction;
   a tool drive means for driving the tools held by the gang heads selectively mounted on the tool support, the tool drive means including a driving shaft mounted in the tool support;
   a frame means;
   a revolving body held by the frame means above the tool support and capable of rotating about an axis extending in the first horizontal direction;
   a first holding means mounted on the revolving body and capable of holding at least two gang heads simultaneously to the revolving body;
   a rotating means for rotating the revolving body in such a way that at least two gang heads placed in first and second positions, respectively, are interchanged, the first position being a location at which each gang head is mounted to the tool suport, the first and second positions being disposed on opposite sides of the axis of the revolving body;

tiltable body mounted on the frame means so as to be tiltable about an axis extending in a second horizontal direction perpendicular to the first horizontal direction;

a second holding means mounted on the tiltable body for holding at least one gang head on the tiltable body;

a tilting means for moving the tiltable body between its horizontal and vertical positions to convey said at least one gang head between the second position and a third position which is displaced 90° upwardly and rearwardly from the second position around the axis of the tiltable body;

a gang head magazine mounted on the frame means and capable of indexing a plurality of gang heads within a horizontal plane so that they may move into the third position in turn; and a guide means which is mounted on the tiltable body and which guides at least two gang heads rotated by the revolving body when the tiltable body is placed in its horizontal position and which cooperates with the magazine to guide the plural gang heads indexed within the magazine when the tiltable body is placed in its vertical position.

2. The machine tool of claim 1, further including:

guide means mounted on the rear surfaces of the gang heads, tools being mounted on the front surfaces of the heads;

arc-shaped guide means mounted on the surface of the tool support on which the gang heads are mounted, the arc-shaped guide means acting to engage the guide means on the gang heads, for guiding the heads when the heads are rotated by the revolving body; and a pair of arc-shaped guide members mounted on the frame means, both ends of each guide means extending to the vicinities of the guide means of the tool support and also to the vicinities of the guide means of the tiltable body placed in its horizontal position so as to engage the guide means of the heads and to guide the heads when the heads are rotated by the revolving body.

3. The machine tool of claim 2, wherein said guide means of the tiltable body comprises:

a first arc-shaped guide portion which, when the tiltable body is placed in its horizontal position, engages the guide means of the gang heads rotated by the revolving body to guide the heads; and a second guide portion which, when the tiltable body is placed in its vertical position and the gang heads are indexed within the magazine, engages the guide members of the heads to guide the heads.

4. The machine tool of claim 3, wherein the guide means mounted on each gang head comprises:

a first arc-shaped guide portion which, when the head is rotated by the revolving body, engages the first arc-shaped guide portion mounted on the tiltable body placed in its horizontal position, the arc-shaped guide members fixed to the frame means, or the arc-shaped guide means mounted on the surface of the tool support on which the heads are mounted; and a second guide portion which, when the heads are indexed within the magazine and pass across the third position, engages the second guide portion on the tiltable body placed in its vertical position.

5. The machine tool of claim 4, wherein said gang head magazine comprises:

a magazine body held on the frame means so as to be capable of being indexed around a vertical axis;

a third holding means mounted on the magazine body and acting to hold the gang heads to the magazine body in such a way that movement of each gang head relative to the magazine body is restricted only in the rotational indexing direction and the radial direction of the magazine body;

an index device for indexing the magazine body to circularly move the gang heads held on the magazine body along a horizontal path extending across the third position; and horizontal guide means disposed for engaging the downwardly facing rear surface of the gang heads circularly moved along the horizontal path so as to guide the gang heads, the horizontal guide means having a cutout portion at a position corresponding to the downwardly facing rear surface of the gang head located at the third position.

6. The machine tool of claim 5, wherein said tiltable body is provided with guide means complemental to the cutout portion of the horizontal guide means when the tiltable body is placed at its vertical position.

7. The machine tool of claim 1, wherein said frame means comprises:

a first frame mounted on the base and supporting the revolving body; and a second frame disposed independently of the base and supporting the tiltable body and the gang head magazine.

8. The machine tool of claim 1, wherein each of said gang heads includes a first engaged member mounted at one side of the gang head and capable of being held by the first holding means, a second engaged member mounted at the other side of the head, and a third engaged member mounted on the rear surface of the head and capable of being held by the second holding means, the tools being mounted on the front surface of the head, and wherein said gang head magazine comprises third holding members capable of holding the second engaged members of the heads, a magazine body having the third holding member and capable of moving within a horizontal plane, and an index device for moving the magazine body within a horizontal plane to selectively place the third holding members close to the third position.

9. The machine tool of claim 8, wherein (A) said second holding means comprises a holding-and-guiding member held to the tiltable body so as to be movable in a direction perpendicular to the axis of the tiltable body, and a driving means for moving the holding-and-guiding member relative to the tiltable body between a holding position at which the gang head is held to the tiltable body and a release position at which the head is released from the tiltable body, said guide means being integral with the holding-and-guiding means;

(B) said first holding means is so shaped that it releases the first engaged member of the gang head located in the second position when the holding-and-guiding member holds the head to the tiltable body and it holds the first engaged member of the head when the head is released from the tiltable body; and (C) each of said third holding means is so shaped that it releases the second engaged member of the gang head located in the third position when the holding-and-guiding member holds the head to the tiltable body and it holds the second engaged member of the gang head when the head is released from the tiltable body.

10. The machine tool of claim 9, further including:
an arc-shaped member mounted on the surface of the tool support on which the gang heads are mounted, the arc-shaped member acting to guide the gang head rotated by the revolving body; and
a pair of arc-shaped guide members fixed to the frame means, both ends of each arc-shaped guide member extending to the vicinities of the arc-shaped member of the tool support and also to the vicinities of the holding-and-guiding member of the tiltable body placed at its horizontal position to guide the gange head rotated by the revolving body.

11. The machine tool of claim 10, wherein said holding-and-guiding member of the tiltable body includes:
a first holding-and-guiding portion aligned with said one pair of arc-shaped guide members and the arc-shaped member of the tool support within a vertical plane when the tiltable body is at its horizontal position and when said holding-and-guiding member is at the release position, so as to guide the third engaged member of each gang head when the same is rotated by the revolving body; and
a second holding-and-guiding portion for guiding the third engaged member of each gang head when the gang heads are indexed within the magazine, with the tiltable body being at its vertical position.

12. The machine tool of claim 11, wherein said gang head magazine includes horizontal guide means for engaging and guiding the downwardly facing rear surfaces of the gang heads when the same are horizontally circulated by the magazine body, said horizontal guide means having a cutout portion at a position corresponding to the downwardly facing rear surface of the gang head located at the third position, and wherein said tiltable body further includes complementary guide means for complementing the cutout portion of the horizontal guide means of the gang head magazine when the tiltable body is placed at its vertical position.

13. A machine tool with a gang head exchange device, comprising:
an index device body provided over a bed;
a revolving body pivotably mounted on the index device body through a first horizontal shaft and having means for detachably carrying gang heads at radially outer portions of the revolving body, the revolving body being rotatable to place the gang heads carried thereby at upper and lower positions;
a machining unit carried on the bed for reciprocative movement in a direction parallel to the first horizontal shaft under the index device body, the gang head at the lower position being attachable to a front end of the machining unit for machining a workpiece;
a magazine having a rotary body mounted at a rear upper position with respect to the upper position and being capable of removably carrying the gang heads at its radially outer portions, the rotary body being rotatable about a vertical shaft for selectively indexing the gang heads carried thereon to a front position; and
a shifting device for exchanging the gang heads carried by the revolving body and the rotary body at the upper and front positions respectively, the shifting device comprising a tiltable body pivotable about a second horizontal shaft extending perpendicularly to the first horizontal shaft, a support member provided at a front end of the tiltable body for supporting one of the gang heads on the tiltable body, a drive mechanism for rotating the tiltable body so as to reciprocatively transfer the gang head between the upper and front positions, and a guide support provided on the support member and engageable with the engaging member of the gang head placed at either of the upper and front positions when the tiltable body is at either of the upper and front positions respectively, for guiding the gang head.

* * * * *